United States Patent Office 2,797,443
Patented July 2, 1957

2,797,443

PROCESS OF MAKING FOAMED RESINS

Frank A. Carlson, Jr., Springfield, Mass., assignor to Monsanto Chemical Company, St. Louis, Mo., a corporation of Delaware No Drawing. Application September 17, 1954,
Serial No. 456,863

4 Claims. (Cl. 18—48)

This invention relates to extruded polystyrene foams. More particularly, the invention relates to a foamable polystyrene composition and to a process for extruding it to produce a foam of fine pore size.

One method for preparing polystyrene foams is to incorporate into polystyrene a relatively small proportion of pentane and then to heat the composition to temperatures above 220° F. in an open or closed mold. For many purposes, it is desirable to produce the foam in the form of a sheet or rod by an extrusion process. When these compositions are extruded it is difficult to obtain a foam in which the cell size is uniform and less than 0.05 inch in diameter. Cells of this size are brittle and the non-uniformity increases the fragile nature of the extruded products.

One object of this invention is to provide a polystyrene composition suitable for extrusion to provide foamed articles in which the cell size is substantially uniform and have a diameter of less than 0.02 inch.

A further object is to provide a process for extruding a polystyrene foamable composition to obtain uniform small diameter cells.

These and other objects are attained by externally blending a particulate styrene polymer containing pentane as a foaming agent with a critical amount of water and immediately thereafter extruding the blended material at temperatures in excess of 250° F.

The following examples are given in illustration and are not intended as limitations on the scope of this invention. Where parts are mentioned they are parts by weight.

Example I

Blend 100 parts of a particulate homopolymer of polystyrene having a molecular weight of about 60,000 (Staudinger) and containing about 5% pentane with 2½ parts of water (containing 0.25% sodium dodecyl benzene sulfonate based on the weight of the water) in a rotary tumbling barrel until the water is homogeneously dispersed throughout the mass of particles. Immediately thereafter extrude the blended material in a conventional extruder through a slot die to form a sheet. The temperature of the die should be about 325° F. and the die pressure should be about 100 p. s. i. No difficulty is met in extruding the blended material into an accurately dimensioned sheet having a density of about 0.066. The polystyrene is completely foamed in a single pass through the extruder and has an average cell diameter of about 0.010 inch. The sheet can be scored and folded through an angle of 180° without fracture.

Repeat Example I using either particulate polystyrene fines capable of passing through a 14-mesh screen or larger particles capable of passing through an 8-mesh screen but retained by a 14-mesh screen. At a pentane content of 8% and using 2% water and no emulsifying agent, efficient extrusion is attained to form a low density fine pore product. The density is about 0.06 and the average cell diameter is about 0.015 inch.

Example II

Extrude a particulate homopolymer of styrene having a molecular weight of about 60,000 (Staudinger) and containing about 5% pentane without preblending the particles with water. At a temperature of about 325° F., a foamed sheet is formed. However, it is practically impossible to control the dimensions of the sheet, the cell size size varies over a wide range with an average diameter of 0.060 inch. The sheets thus produced are relatively brittle and cannot be bent through a 180° angle without complete fracture.

Attempts to achieve the results of Example I by adding water to the particulate material in the extruder at the hopper simultaneously with the loading of the particles into the extruder resulted in a failure of the extrusion process altogether, the wet material being taken up by the extruder screw only when considerable external pressure was applied to the particles and even then extrusion was uneven and did not result in a product of small uniform pore size.

Example III

Blend 100 parts of a particulate polystyrene having a molecular weight of 45,000–50,000 (Staudinger) and containing 6% pentane and 3% of butyl stearate with 2½% of water containing .25% of sodium dodecyl benzene sulfonate (based on the weight of the water) in a rotary tumbling apparatus until the water is thoroughly intermingled with the polymer particles. Extrude the blended materials through a slot die at a die temperature of about 320° F. and a die pressure of about 100 p. s. i. A continuous strip of foamed polystyrene is formed having a density of about 0.06 and an average cell diameter of about 0.010 inch. The strip is quite flexible.

The amount of water may be varied between 2.0 and 3% by weight based on the combined weight of the styrene polymer and pentane. Below 2%, substantially no beneficial results are obtained and above 3%, the treated material cannot be extruded under practical conditions. Between 2% and 3%, there appears to be no particular variation in the diameter of the foam cells produced.

In some cases, it is desirable to incorporate a small amount of a wetting agent in the water. In general, from 0.1 to 0.5% of wetting agent is used based on the amount of water. Various wetting agents including soaps, long chain alkyl sulfates, alkaryl sulfonates, polyalkoxy alkylene ethers, amine salts, quaternary ammonium compounds, may be used.

The foamable polystyrene materials which are operative in this invention are homopolymers of styrene, copolymers of styrene containing a major amount of styrene providing that pentane is soluble in said copolymers, and blends of styrene polymers with butadiene-styrene copolymers. The polymer, copolymer or blend should be in particulate form and should contain from 1 to 10% of pentane as the foaming agent. Pentane is soluble in polystyrene and most copolymers which contain a preponderant amount of styrene and also in styrene-butadiene copolymers of various compositions. A convenient way of incorporating the pentane in the resin is to dissolve it in styrene monomer followed by polymerization of the monomer at relatively low temperatures.

The water should be added to the resin by blending it with the resin in particulate form in rotary blenders or tumbling apparatus. The blending operation should be carried out at temperatures below 40° C. and should be continued until the water is thoroughly intermingled with the particles of resin.

After the blending operation is completed, the blended material should be extruded immediately, i. e., without any extended storage period prior to extrusion. The extrusion operation is carried out in continuous screw extruders at temperatures ranging from 250° F. to 400° F., depending on the softening temperatures of the polymer, copolymer or blend. The most uniform material is obtained at temperatures of 300–325° F. The material may be extruded through dies of any desired configuration into open or closed molds or into the open air. The pressure at the die should be less than 150 p. s. i. and preferably should be regulated within the limits 50–130 p. s. i.

The extruded resin compositions of this invention are light weight closed cell foams having a density of less than 0.1 and the cells thereof have an average diameter of less than 0.02 inch. The foamed products may be used as insulation, in packaging applications, etc.

What is claimed is:

1. A process for producing extruded polystyrene foams of fine pore size which comprises blending a particulate styrene polymer containing from 1 to 10% pentane by weight with from 2 to 3% water by weight, based on the combined weight of polymer and pentane, and immediately thereafter extruding the blended material at temperatures above 250° F. and at a die pressure of 50–130 p. s. i.

2. A process as in claim 1 wherein the water contains from 0.1 to 0.5% by weight, based on the weight of the water, of a wetting agent.

3. A process as in claim 2 wherein the wetting agent is sodium dodecyl benzene sulfonate.

4. A process for producing polystyrene foams of fine pore size which comprises blending a particulate homopolymer of styrene containing 5% pentane by weight with 2½% of water by weight, based on the combined weight of polymer and pentane, and immediately thereafter extruding the blended material at 325° F. and a die pressure of 100 p. s. i.

References Cited in the file of this patent

UNITED STATES PATENTS

| | | |
|---|---|---|
| 2,442,940 | Staudinger et al. | June 8, 1948 |
| 2,528,200 | Weinberg | Oct. 31, 1950 |
| 2,537,977 | Dulmage | Jan. 16, 1951 |
| 2,681,321 | Stastny | June 15, 1954 |
| 2,744,291 | Stastny et al. | May 3, 1956 |